(12) United States Patent
Roman et al.

(10) Patent No.: US 8,942,727 B1
(45) Date of Patent: Jan. 27, 2015

(54) USER LOCATION TRACKING

(71) Applicant: ACR Development, Inc., Lynbrook, NY (US)

(72) Inventors: Anthony C. Roman, Rockville Centre, NY (US); Michael P. Hammond, Jr., Port Jefferson Station, NY (US); Douglas J. Rose, New Rochelle, NY (US)

(73) Assignee: ACR Development, Inc., Lynbrook, NY (US)

( * ) Notice: Subject to any disclaimer, the term of this patent is extended or adjusted under 35 U.S.C. 154(b) by 0 days.

(21) Appl. No.: 14/251,098

(22) Filed: Apr. 11, 2014

(51) Int. Cl.
*H04W 24/00* (2009.01)
*H04L 29/08* (2006.01)

(52) U.S. Cl.
CPC ................................ *H04L 67/18* (2013.01)
USPC .............. 455/456.1; 455/404.2; 455/414.2; 455/456.3; 455/457

(58) Field of Classification Search
CPC ....... H04W 64/00; H04W 4/02; H04W 36/32; H04W 36/08; H04W 8/183; H04W 48/18; H04W 4/22; H04W 76/007
USPC .................. 455/404.2, 432.1, 435.1, 440, 455/456.1–456.3
See application file for complete search history.

(56) References Cited

U.S. PATENT DOCUMENTS

| | | | |
|---|---|---|---|
| 4,800,521 A | 1/1989 | Carter et al. | |
| 5,111,391 A | 5/1992 | Fields et al. | |
| 5,185,780 A | 2/1993 | Leggett | |
| 5,276,768 A | 1/1994 | Bander | |
| 5,541,845 A | 7/1996 | Klein | |
| 5,712,985 A | 1/1998 | Lee et al. | |
| 5,724,243 A | 3/1998 | Westerlage et al. | |
| 5,745,687 A | 4/1998 | Randell | |
| 5,809,479 A | 9/1998 | Martin et al. | |
| 5,938,720 A | 8/1999 | Tamai | |
| 5,943,652 A | 8/1999 | Sisley et al. | |
| 6,088,679 A | 7/2000 | Barkley | |
| 6,192,346 B1 | 2/2001 | Green | |
| 6,275,812 B1 | 8/2001 | Haq et al. | |
| 6,327,611 B1 | 12/2001 | Everingham | |
| 6,349,238 B1 | 2/2002 | Gabbita et al. | |

(Continued)

FOREIGN PATENT DOCUMENTS

AU 2013100749 A4 7/2013
CA 2279191 A1 8/1998

(Continued)

OTHER PUBLICATIONS

"Smart Phone+Mail Server=Location Tracking," accessed on the internet at http://blog.spiderlabs.com/2012/09/smart-phone-mail-server-locationtracking.html; downloaded Apr. 8, 2014; 5pgs.

(Continued)

*Primary Examiner* — Dai A Phuong
(74) *Attorney, Agent, or Firm* — Goodwin Procter LLP

(57) ABSTRACT

Methods, systems, and apparatus, including computer programs encoded on a computer storage medium, for receiving information from a remote system comprising one or more time periods during which a location of the client device can be tracked and monitoring the location of the client device during each of the time periods by obtaining a plurality of location coordinates from the client device during the time period and persistently storing the location coordinates on the client device.

14 Claims, 5 Drawing Sheets

(56) References Cited

U.S. PATENT DOCUMENTS

| | | |
|---|---|---|
| 6,415,259 B1 | 7/2002 | Wolfinger et al. |
| 6,662,237 B1 | 12/2003 | Leckie |
| 6,678,714 B1 | 1/2004 | Olapurath et al. |
| 6,707,421 B1 | 3/2004 | Drury et al. |
| 6,728,634 B2 | 4/2004 | Monde et al. |
| 6,860,422 B2 | 3/2005 | Hull et al. |
| 6,937,993 B1 | 8/2005 | Gabbita et al. |
| 6,985,872 B2 | 1/2006 | Benbassatt et al. |
| 7,031,728 B2 | 4/2006 | Beyer, Jr. |
| 7,072,765 B2 | 7/2006 | Schmidt et al. |
| 7,082,473 B2 | 7/2006 | Breitbart et al. |
| 7,110,881 B2 | 9/2006 | Gray et al. |
| 7,149,700 B1 | 12/2006 | Munoz et al. |
| 7,155,400 B1 | 12/2006 | Jilk et al. |
| 7,155,720 B2 | 12/2006 | Casati et al. |
| 7,222,081 B1 | 5/2007 | Sone |
| 7,222,304 B2 | 5/2007 | Beaton et al. |
| 7,280,481 B2 | 10/2007 | Rong |
| 7,286,489 B2 | 10/2007 | Ades |
| 7,310,626 B2 | 12/2007 | Scarborough et al. |
| 7,330,830 B1 | 2/2008 | Lamoureux et al. |
| 7,379,062 B2 | 5/2008 | Poole |
| 7,487,106 B2 | 2/2009 | Levine et al. |
| 7,499,715 B2 | 3/2009 | Carro et al. |
| 7,503,480 B2 | 3/2009 | Barnes et al. |
| 7,539,627 B2 | 5/2009 | Schmidt |
| 7,546,346 B2 | 6/2009 | Ouchi |
| 7,577,706 B2 | 8/2009 | Arregui et al. |
| 7,596,416 B1 | 9/2009 | Maluf et al. |
| 7,640,548 B1 | 12/2009 | Yu et al. |
| 7,650,293 B2 | 1/2010 | Kiran et al. |
| 7,657,831 B2 | 2/2010 | Donahue |
| 7,764,954 B2 | 7/2010 | Beyer, Jr. |
| 7,765,121 B2 | 7/2010 | Pace et al. |
| 7,769,396 B2 | 8/2010 | Alizadeh-Shabdiz et al. |
| 7,797,182 B2 | 9/2010 | Lindquist et al. |
| 7,849,044 B2 | 12/2010 | Nelken |
| 7,869,941 B2 | 1/2011 | Coughlin et al. |
| 7,870,012 B2 | 1/2011 | Katz et al. |
| 7,881,957 B1 | 2/2011 | Cohen et al. |
| 7,908,320 B2 | 3/2011 | Ludwig et al. |
| 7,937,655 B2 | 5/2011 | Teng et al. |
| 7,962,358 B1 | 6/2011 | Fernandez et al. |
| 7,987,051 B2 | 7/2011 | Gnanasambandam et al. |
| 8,015,043 B2 | 9/2011 | Cao et al. |
| 8,019,622 B2 | 9/2011 | Kaboff et al. |
| 8,027,861 B2 | 9/2011 | Brintle |
| 8,108,141 B2 | 1/2012 | Ehrlacker |
| 8,121,888 B1 | 2/2012 | Cohen et al. |
| 8,126,441 B2 | 2/2012 | Beyer, Jr. |
| 8,165,792 B2 | 4/2012 | Mikan et al. |
| 8,170,897 B1 | 5/2012 | Cohen et al. |
| 8,180,376 B1 | 5/2012 | Merritt |
| 8,208,159 B2 | 6/2012 | Knodt et al. |
| 8,219,432 B1 | 7/2012 | Bradley et al. |
| 8,249,810 B2 | 8/2012 | Jones |
| 8,286,183 B2 | 10/2012 | Baird et al. |
| 8,290,479 B2 | 10/2012 | Aaron et al. |
| 8,301,158 B1 | 10/2012 | Thomas |
| 8,312,047 B2 | 11/2012 | Barker et al. |
| 8,321,527 B2 | 11/2012 | Martin et al. |
| 8,332,249 B1 | 12/2012 | Aykin |
| 8,332,793 B2 | 12/2012 | Bose |
| 8,347,295 B1 | 1/2013 | Robertson et al. |
| 8,370,846 B2 | 2/2013 | Hayashi |
| 8,386,300 B2 | 2/2013 | April et al. |
| 8,395,547 B2 | 3/2013 | Dhanani et al. |
| 8,412,154 B1 | 4/2013 | Leemet et al. |
| 8,423,451 B1 | 4/2013 | Flaxman et al. |
| 8,433,341 B2 | 4/2013 | Dredge |
| 8,437,954 B1 | 5/2013 | Freeman et al. |
| 8,473,197 B2 | 6/2013 | Horvitz |
| 8,478,526 B2 | 7/2013 | Chitre et al. |
| 8,508,767 B2 | 8/2013 | Carter et al. |
| 8,509,212 B2 | 8/2013 | Sanjeev et al. |
| 8,515,801 B2 | 8/2013 | Guthrie |
| 8,521,367 B2 | 8/2013 | Mulder et al. |
| 8,531,289 B2 | 9/2013 | Scalisi et al. |
| 8,538,458 B2 | 9/2013 | Haney |
| 8,538,688 B2 | 9/2013 | Prehofer |
| 8,553,562 B2 | 10/2013 | Allan et al. |
| 8,554,776 B1 | 10/2013 | Barak et al. |
| 8,558,693 B2 | 10/2013 | Martin et al. |
| 8,559,968 B2 | 10/2013 | Frank et al. |
| 8,559,977 B2 | 10/2013 | Busch |
| 8,560,236 B1 | 10/2013 | Zahir et al. |
| 8,565,788 B2 | 10/2013 | Houri |
| 8,583,090 B2 | 11/2013 | Vartiainen et al. |
| 8,583,466 B2 | 11/2013 | Margulies et al. |
| 8,588,810 B2 | 11/2013 | Dai et al. |
| 8,595,041 B2 | 11/2013 | Schmidt |
| 8,606,230 B2 | 12/2013 | Smith et al. |
| 8,606,514 B2 | 12/2013 | Rowley et al. |
| 8,611,927 B2 | 12/2013 | Root et al. |
| 8,612,280 B2 | 12/2013 | Shepherd et al. |
| 8,624,727 B2 | 1/2014 | Saigh et al. |
| 8,626,438 B2 | 1/2014 | Petzold et al. |
| 8,627,323 B2 | 1/2014 | Owen et al. |
| 8,639,543 B2 | 1/2014 | Boss et al. |
| 8,655,677 B2 | 2/2014 | Reiner |
| 8,660,877 B2 | 2/2014 | Mitchell et al. |
| 8,686,861 B2 | 4/2014 | Chung et al. |
| 8,687,795 B2 | 4/2014 | Kosiba et al. |
| 8,694,350 B1 | 4/2014 | Cohen et al. |
| 8,700,310 B2 | 4/2014 | Jayanthi |
| 8,712,811 B2 | 4/2014 | Fredericks et al. |
| 8,732,574 B2 | 5/2014 | Burr et al. |
| 8,738,401 B2 | 5/2014 | Reynolds et al. |
| 8,745,220 B2 | 6/2014 | Raleigh et al. |
| 8,776,073 B1 | 7/2014 | Morlen |
| 2002/0022982 A1 | 2/2002 | Cooperstone et al. |
| 2002/0029161 A1 | 3/2002 | Brodersen et al. |
| 2002/0052770 A1 | 5/2002 | Podrazhansky |
| 2002/0087382 A1 | 7/2002 | Tiburcio |
| 2002/0111842 A1 | 8/2002 | Miles |
| 2002/0129139 A1 | 9/2002 | Ramesh |
| 2003/0055706 A1 | 3/2003 | Statfeld |
| 2003/0191680 A1 | 10/2003 | Dewar |
| 2003/0214657 A1 | 11/2003 | Stringham |
| 2004/0019504 A1 | 1/2004 | Korom et al. |
| 2004/0039520 A1 | 2/2004 | Khavakh et al. |
| 2004/0078373 A1 | 4/2004 | Ghoneimy et al. |
| 2004/0124977 A1 | 7/2004 | Biffar |
| 2004/0177095 A1 | 9/2004 | West |
| 2004/0196184 A1* | 10/2004 | Hollander et al. ............ 342/418 |
| 2004/0210464 A1 | 10/2004 | Belanger et al. |
| 2004/0267592 A1 | 12/2004 | Ogushi et al. |
| 2005/0060217 A1 | 3/2005 | Douglas et al. |
| 2005/0068980 A1 | 3/2005 | Mathew et al. |
| 2005/0096961 A1 | 5/2005 | Schaaf et al. |
| 2005/0102394 A1 | 5/2005 | Loveland |
| 2005/0138031 A1 | 6/2005 | Wefers |
| 2005/0149376 A1 | 7/2005 | Guyan et al. |
| 2006/0083267 A1* | 4/2006 | Laroia et al. ................. 370/503 |
| 2006/0094350 A1* | 5/2006 | Ishimura et al. ................. 455/9 |
| 2006/0106846 A1 | 5/2006 | Schulz et al. |
| 2006/0117012 A1 | 6/2006 | Rizzolo et al. |
| 2006/0143107 A1 | 6/2006 | Dumas et al. |
| 2006/0155460 A1 | 7/2006 | Raney |
| 2006/0217876 A1 | 9/2006 | Houri et al. |
| 2006/0241857 A1 | 10/2006 | Onishi et al. |
| 2006/0282306 A1 | 12/2006 | Thissen-Roe |
| 2007/0032225 A1 | 2/2007 | Konicek et al. |
| 2007/0043603 A1 | 2/2007 | Andersen et al. |
| 2007/0075518 A1 | 4/2007 | Murata |
| 2007/0129983 A1 | 6/2007 | Scherpbier et al. |
| 2007/0192157 A1 | 8/2007 | Gooch |
| 2007/0208606 A1 | 9/2007 | Mackay et al. |
| 2007/0244736 A1 | 10/2007 | Johnson |
| 2007/0276713 A1 | 11/2007 | Lee et al. |
| 2008/0004933 A1 | 1/2008 | Gillespie |
| 2008/0034347 A1 | 2/2008 | V et al. |
| 2008/0040193 A1 | 2/2008 | Dion |
| 2008/0045234 A1 | 2/2008 | Reed |

(56) References Cited

U.S. PATENT DOCUMENTS

| | | |
|---|---|---|
| 2008/0046862 A1 | 2/2008 | Sattler et al. |
| 2008/0077530 A1 | 3/2008 | Banas et al. |
| 2008/0088438 A1 | 4/2008 | Aninye |
| 2008/0091782 A1 | 4/2008 | Jakobson |
| 2008/0097827 A1 | 4/2008 | Leach et al. |
| 2008/0103868 A1 | 5/2008 | Santos et al. |
| 2008/0162242 A1 | 7/2008 | Schneur et al. |
| 2008/0164998 A1 | 7/2008 | Scherpbier et al. |
| 2008/0243575 A1 | 10/2008 | Weinberger |
| 2008/0244589 A1 | 10/2008 | Darnell et al. |
| 2008/0270214 A1 | 10/2008 | Eiby et al. |
| 2008/0270546 A1 | 10/2008 | Morris et al. |
| 2008/0288539 A1 | 11/2008 | Jacobs |
| 2008/0294505 A1 | 11/2008 | Markowitz et al. |
| 2008/0306806 A1 | 12/2008 | Van Wyk et al. |
| 2009/0006164 A1 | 1/2009 | Kaiser et al. |
| 2009/0019051 A1 | 1/2009 | Winburn |
| 2009/0037880 A1 | 2/2009 | Adger, III et al. |
| 2009/0077165 A1 | 3/2009 | Rhodes et al. |
| 2009/0089737 A1 | 4/2009 | Komatsu |
| 2009/0147940 A1 | 6/2009 | Graves et al. |
| 2009/0210148 A1 | 8/2009 | Jayanthi |
| 2009/0222299 A1 | 9/2009 | Clemenson et al. |
| 2009/0228198 A1 | 9/2009 | Goldberg et al. |
| 2009/0240553 A1 | 9/2009 | Sato |
| 2009/0292463 A1 | 11/2009 | Chase |
| 2009/0299811 A1 | 12/2009 | Verfuerth et al. |
| 2010/0083253 A1 | 4/2010 | Kushwaha |
| 2010/0121566 A1 | 5/2010 | Joshi et al. |
| 2010/0131124 A1 | 5/2010 | Klooster |
| 2010/0173647 A1* | 7/2010 | Sheynblat ............... 455/456.1 |
| 2010/0174577 A1 | 7/2010 | Duffy et al. |
| 2010/0184452 A1* | 7/2010 | Choi ....................... 455/456.3 |
| 2010/0191454 A1 | 7/2010 | Shirai et al. |
| 2010/0223557 A1 | 9/2010 | Kenney et al. |
| 2010/0289644 A1 | 11/2010 | Slavin et al. |
| 2011/0022503 A1 | 1/2011 | Parker-Yules |
| 2011/0066468 A1 | 3/2011 | Huang et al. |
| 2011/0106736 A1 | 5/2011 | Aharonson et al. |
| 2011/0126158 A1 | 5/2011 | Fogarty et al. |
| 2011/0131075 A1 | 6/2011 | Robertson et al. |
| 2011/0154338 A1 | 6/2011 | Ramanathaiah et al. |
| 2011/0178945 A1 | 7/2011 | Hirai |
| 2011/0184771 A1 | 7/2011 | Wells |
| 2011/0208557 A1 | 8/2011 | Gonzalez Diaz et al. |
| 2011/0246564 A1 | 10/2011 | Agrawal et al. |
| 2011/0276896 A1 | 11/2011 | Zambetti et al. |
| 2011/0282829 A1 | 11/2011 | Rangaswamy et al. |
| 2012/0016710 A1 | 1/2012 | Santos et al. |
| 2012/0040640 A1* | 2/2012 | Zhou et al. ................ 455/410 |
| 2012/0042003 A1 | 2/2012 | Goetz et al. |
| 2012/0072253 A1 | 3/2012 | Ritter et al. |
| 2012/0072268 A1 | 3/2012 | Ritter et al. |
| 2012/0079409 A1 | 3/2012 | Luo et al. |
| 2012/0095925 A1 | 4/2012 | Agarwal et al. |
| 2012/0096463 A1 | 4/2012 | Agarwal et al. |
| 2012/0109700 A1 | 5/2012 | Cook et al. |
| 2012/0110087 A1 | 5/2012 | Culver et al. |
| 2012/0129510 A1 | 5/2012 | Bradburn |
| 2012/0130727 A1 | 5/2012 | Ahmed |
| 2012/0158865 A1 | 6/2012 | Kurian et al. |
| 2012/0159488 A1 | 6/2012 | Kurian et al. |
| 2012/0166266 A1 | 6/2012 | Rampalli et al. |
| 2012/0179504 A1 | 7/2012 | Nakashima |
| 2012/0197670 A1 | 8/2012 | Poon |
| 2012/0203588 A1 | 8/2012 | Burri et al. |
| 2012/0209649 A1 | 8/2012 | Ovenden et al. |
| 2012/0209650 A1 | 8/2012 | Romagnino et al. |
| 2012/0209706 A1 | 8/2012 | Ramer et al. |
| 2012/0210252 A1 | 8/2012 | Fedoseyeva et al. |
| 2012/0215578 A1 | 8/2012 | Swierz et al. |
| 2012/0227044 A1 | 9/2012 | Arumugham et al. |
| 2012/0240061 A1 | 9/2012 | Hillenius et al. |
| 2012/0240122 A1 | 9/2012 | Brown et al. |
| 2012/0246654 A1 | 9/2012 | Eichenberger et al. |
| 2012/0254153 A1 | 10/2012 | Abraham et al. |
| 2012/0291041 A1 | 11/2012 | Cipar et al. |
| 2012/0302256 A1 | 11/2012 | Pai et al. |
| 2012/0304187 A1 | 11/2012 | Maresh et al. |
| 2012/0310445 A1 | 12/2012 | Hatton et al. |
| 2012/0311585 A1 | 12/2012 | Gruber et al. |
| 2012/0320407 A1 | 12/2012 | Hoarau et al. |
| 2013/0006521 A1 | 1/2013 | Needham et al. |
| 2013/0012234 A1 | 1/2013 | Tufty et al. |
| 2013/0012802 A1 | 1/2013 | Horseman |
| 2013/0013996 A1 | 1/2013 | Wu |
| 2013/0024231 A1 | 1/2013 | Gordon et al. |
| 2013/0040600 A1 | 2/2013 | Reitnour et al. |
| 2013/0041707 A1 | 2/2013 | Bose et al. |
| 2013/0054646 A1 | 2/2013 | Zizka et al. |
| 2013/0066646 A1 | 3/2013 | Backhaus et al. |
| 2013/0090968 A1 | 4/2013 | Borza |
| 2013/0096813 A1 | 4/2013 | Geffner et al. |
| 2013/0102283 A1 | 4/2013 | Lau et al. |
| 2013/0110392 A1 | 5/2013 | Kosseifi et al. |
| 2013/0115969 A1 | 5/2013 | Holmes et al. |
| 2013/0124254 A1 | 5/2013 | Jafri et al. |
| 2013/0159908 A1 | 6/2013 | Mayerle et al. |
| 2013/0165153 A1 | 6/2013 | Turk et al. |
| 2013/0179208 A1 | 7/2013 | Chung et al. |
| 2013/0181867 A1 | 7/2013 | Sturdivant et al. |
| 2013/0212521 A1 | 8/2013 | Fedoseyeva et al. |
| 2013/0217364 A1 | 8/2013 | Varoglu et al. |
| 2013/0226639 A1 | 8/2013 | Yokoyama et al. |
| 2013/0260785 A1 | 10/2013 | Shakespeare et al. |
| 2013/0262174 A1 | 10/2013 | Singh et al. |
| 2013/0290063 A1 | 10/2013 | Gonzalez Diaz et al. |
| 2013/0295910 A1* | 11/2013 | Enty et al. ..................... 455/419 |
| 2013/0311160 A1 | 11/2013 | Cowie |
| 2013/0318533 A1 | 11/2013 | Aghassipour et al. |
| 2013/0332214 A1 | 12/2013 | George et al. |
| 2013/0344891 A1* | 12/2013 | Hotes et al. ................ 455/456.1 |
| 2014/0006077 A1 | 1/2014 | Davis |
| 2014/0006078 A1 | 1/2014 | McGauley et al. |
| 2014/0006519 A1 | 1/2014 | Guenther et al. |
| 2014/0019187 A1 | 1/2014 | Olsen et al. |
| 2014/0032326 A1 | 1/2014 | Li et al. |
| 2014/0036905 A1 | 2/2014 | Yilmaz et al. |
| 2014/0039953 A1 | 2/2014 | Mcquillan |
| 2014/0040028 A1 | 2/2014 | King et al. |
| 2014/0045457 A1 | 2/2014 | Mahaffey et al. |
| 2014/0053096 A1 | 2/2014 | Alonso Lago |
| 2014/0058674 A1 | 2/2014 | Shekhar et al. |
| 2014/0059557 A1 | 2/2014 | Kramer |
| 2014/0074743 A1 | 3/2014 | Rademaker |
| 2014/0082521 A1 | 3/2014 | Carolan et al. |
| 2014/0089822 A1 | 3/2014 | Wu et al. |
| 2014/0095236 A1 | 4/2014 | Podgurny et al. |
| 2014/0108094 A1 | 4/2014 | Beddo et al. |
| 2014/0108397 A1 | 4/2014 | Zubizarreta et al. |
| 2014/0114727 A1 | 4/2014 | Shan et al. |
| 2014/0148141 A1* | 5/2014 | Snapp ........................ 455/418 |
| 2014/0159483 A1 | 6/2014 | Robertazzi et al. |
| 2014/0164044 A1 | 6/2014 | DeRoller |
| 2014/0195274 A1 | 7/2014 | Annappindi |
| 2014/0195290 A1 | 7/2014 | Plost et al. |
| 2014/0219373 A1* | 8/2014 | Mobasher et al. ............ 375/267 |
| 2014/0274121 A1* | 9/2014 | Raniere ...................... 455/456.1 |
| 2014/0298207 A1 | 10/2014 | Ittah et al. |

FOREIGN PATENT DOCUMENTS

| | | |
|---|---|---|
| CA | 2305479 A1 | 11/2000 |
| CA | 2514824 A1 | 6/2004 |
| CA | 2568216 A1 | 2/2005 |
| CA | 2617768 A1 | 2/2007 |
| CA | 2571785 A1 | 3/2007 |
| CA | 2701367 A1 | 10/2010 |
| CA | 2744473 A1 | 12/2011 |
| CN | 1891008 A | 1/2007 |
| CN | 102505591 A | 6/2012 |
| CN | 102523155 A | 6/2012 |
| CN | 103534685 A | 1/2014 |
| EP | 1367513 A2 | 12/2003 |

(56) References Cited

FOREIGN PATENT DOCUMENTS

| | | |
|---|---|---|
| EP | 1473649 A1 | 11/2004 |
| EP | 1532600 A2 | 5/2005 |
| EP | 1680727 A2 | 7/2006 |
| EP | 2290907 A1 | 3/2011 |
| EP | 2336958 A1 | 6/2011 |
| EP | 2385476 A1 | 11/2011 |
| EP | 2458531 A1 | 5/2012 |
| EP | 2660745 A2 | 11/2013 |
| JP | 2008054026 A | 3/2008 |
| JP | 2008217719 A | 9/2008 |
| JP | 2009151472 A | 7/2009 |
| JP | 2009199251 A | 9/2009 |
| JP | 2009205341 A | 9/2009 |
| JP | 2013029873 A | 2/2013 |
| JP | 2013045418 A | 3/2013 |
| TW | 201324451 A | 6/2013 |
| TW | 201340028 A | 10/2013 |
| WO | WO-93/05492 A1 | 3/1993 |
| WO | WO-02/21403 A1 | 3/2002 |
| WO | WO-02/46884 A2 | 6/2002 |
| WO | WO-02/101623 A2 | 12/2002 |
| WO | WO-03/038658 A2 | 5/2003 |
| WO | WO-2004/001613 A1 | 12/2003 |
| WO | WO-2004/086267 A2 | 10/2004 |
| WO | WO-2004/102431 A1 | 11/2004 |
| WO | WO-2005/006125 A2 | 1/2005 |
| WO | WO-2005/013075 A2 | 2/2005 |
| WO | WO-2006/019271 A1 | 2/2006 |
| WO | WO-2006/074065 A2 | 7/2006 |
| WO | WO-2007/061264 A1 | 5/2007 |
| WO | WO-2007/071913 A1 | 6/2007 |
| WO | WO-2007/081823 A2 | 7/2007 |
| WO | WO-2008/007983 A2 | 1/2008 |
| WO | WO-2008/082789 A2 | 7/2008 |
| WO | WO-2008/094552 A2 | 8/2008 |
| WO | WO-2008/144645 A2 | 11/2008 |
| WO | WO-2009/012316 A1 | 1/2009 |
| WO | WO-2009/079609 A2 | 6/2009 |
| WO | WO-2009/102728 A1 | 8/2009 |
| WO | WO-2010/030917 A2 | 3/2010 |
| WO | WO-2010/062585 A2 | 6/2010 |
| WO | WO-2010/096772 A2 | 8/2010 |
| WO | WO-2011/105997 A1 | 9/2011 |
| WO | WO-2012/089284 A2 | 7/2012 |
| WO | WO-2012095456 A2 | 7/2012 |
| WO | WO-2012151216 A1 | 11/2012 |
| WO | WO-2012/167168 A2 | 12/2012 |
| WO | WO-2013/015809 A1 | 1/2013 |
| WO | WO-2013/050586 A2 | 4/2013 |
| WO | WO-2013/074377 A1 | 5/2013 |
| WO | WO-2013/159974 A1 | 10/2013 |
| WO | WO-2013155255 A1 | 10/2013 |
| WO | WO-2013/186519 A2 | 12/2013 |
| WO | WO-2014001549 A1 | 1/2014 |
| WO | WO-2014/023851 A1 | 2/2014 |
| WO | WO-2014026023 A1 | 2/2014 |
| WO | WO-2014068314 A1 | 5/2014 |

OTHER PUBLICATIONS

"Track My People Solution," accessed on the internet at http://www.craveinfotech.com/track-people-solution.aspx, downloaded Apr. 8, 2014; 2pgs.

"State-of-the Art Fleet Management and Vehicle Tracking Solution to Increase Your Productivity," accessed on the internet at http://www.maptell.com/download/maptellZorbaATS.pdf; downloaded Apr. 8, 2014; 7pgs.

"Mobile Tracker (U Safe Tracker)," accessed on the internet at https://play.google.com/store/apps/details?id=homesoft.app.falcontracker&hl=en; downloaded Apr. 8, 2014; 3pgs.

Padmavathy et al., "An Efficient Tracking of Human Mobility and Events Based on WPS Using Android Technology," Int J Adv Computational Eng and Networking; 1(9):57-61; Nov. 2013.

"GPS Employee Tracking," accessed on the internet at http://gpsemployeetracking.com/features; downloaded Mar. 9, 2014; 7pgs.

"US Fleet & Mobile Workforce Tracking | Mobile Resource & Asset Management," accessed on the internet at http://www.mygeotracking.com/products-mobile-workforce-fleet-tracking-mobile-marketing; downloaded Mar. 9, 2014; 6pgs.

"Tracking Employee Mobile Phone Is Critical," accessed on the internet at http://www.phonesheriff.com/employee-mobile-tracking.html; downloaded Mar. 9, 2014; 11pgs.

"Stealth Genie Features," accessed on the internet at http://stealthgenie.com/features.html; downloaded Mar. 9, 2014; 11pgs.

"TeleNaV Track," accessed on the internet at http://enterprise.telenav.com/solutions.html; downloaded Mar. 9, 2014; 3pgs.

"Workforce Optimization: Identification and Assignment of Professional Workers Using Constraint Programming," accessed on the internet at http://ieeexplore.ieee.org/xpl/articleDetails.jsp?tp=&arnumber=5388666&matchBoolean%3Dtrue%26searchField%3DSearch_All%26queryText%3D%28%28p_Abstract%3Atask+assignment%29+AND+p_Abstract%3Alocation+and+skill%29, May 2007; downloaded Jul. 28, 2014; 2pgs.

"Employee Positioning and Workload Allocation," accessed on the internet at http://www.sciencedirect.com/science/article/pii/S0305054806001031, Feb. 2008; downloaded Jul. 28, 2014; 1pg.

"Workforce Management," accessed on the internet at http://www.aspect.com/resourcecatalog/aspect-healthcare-workforce-management-ds.pdf; downloaded Jul. 28, 2014; 5pgs.

"Staff Optimization—A Prescription for Superior Patient Outcomes," accessed on the internet at http://www.aspect.com/resourcecatalog/staff-optimization-wp.pdf; downloaded Jul. 28, 2014; 3pgs.

"Simulation Tool for Manpower Forecast Loading and Resource Leveling," accessed on the internet at http://ieeexplore.ieee.org/xpl/articleDetails.jsp?tp=&arnumber=4419842&queryText%3Dmanpower+requirement+forecasting, Dec. 2007; downloaded Jul. 28, 2014; 2pgs.

"The Concept of Manpower Forecasts," accessed on the internet at http://www.businessteacher.org.uk/essays/finance/the-concept-of-manpower-forecasts.php; downloaded Jul. 28, 2014; 10pgs.

"ForecastPro—Predictions Your Business Can Rely On," accessed on the internet at http://www.invisionwfm.com/products/forecasting/forecastpro; downloaded Jul. 28, 2014; 3pgs.

"Labor Planning and Automation in a 3p1 Environment," accessed on the internet at http://www.accellos.com/about-us/resources/white-papers/thank-labor-planning-automation; downloaded Jul. 28, 2014; 5pgs.

"The Shortest Path: Comparison of Different Approaches and Implementation for the Automatic Routing of Vehicles," accessed on the internet at http://informs-sim.org/wscl2papers/includes/files/con231.pdf; downloaded Jul. 28, 2014; 12pgs.

"Employee Transport Management System," accessed on the internet at http://www.aticdata.com/employee.aspx; downloaded Jul. 28, 2014; 2pgs.

"Using GPS Data to Understand Variations in Path Choice," accessed on the internet at https://pantherfile.uwm.edu/horowitz/www/pathchoice.pdf; downloaded Jul. 28, 2014; 12pgs.

""Simplest" Paths: Automated Route Selection for Navigation," accessed on the internet at http://www.geosensor.net/papers/sp8.pdf; downloaded Jul. 28, 2014; 18pgs.

"The Traveling Salesman Goes Shopping: The Systematic Deviations of Grocery Paths from TSP Optimality," accessed on the internet at http://pubsonline.informs.org/doi/abs/10.1287/mksc.1080.0402; downloaded Jul. 28, 2014; 1pg.

* cited by examiner

USER LOCATION TRACKING

BACKGROUND

This specification relates to user task management and user task progress and location tracking Task management is the process of managing tasks throughout their lifecycle. Typical project management software can manage estimation and planning, scheduling, cost control and budget for tasks within a project. Mobile device tracking refers to attaining the current geographic location of the mobile device by receiving location coordinates from the device.

SUMMARY

In general, one aspect of the subject matter described in this specification can be embodied in methods that include the actions of assigning a respective task to each user of a plurality of users, the task having a schedule indicating one or more scheduled times when the user should be located at a respective geographic location for the scheduled time; sending respective information to one or more client devices, wherein each client device is associated with a different one of the users and wherein the information comprises the geographic locations indicated by the schedule for the task assigned to the user, wherein the client device is configured to track locations of the client device; receiving tracked locations from a plurality of the client devices and monitoring the tracked locations over time; determining a respective task progress for each of a plurality of first users based on monitoring; and modifying the respective task assigned to one or more second users based on the respective task progresses. Other embodiments of this aspect include corresponding systems, apparatus, and computer programs.

These and other aspects can optionally include one or more of the following features. Determining the respective task progress for a particular user can comprise determining based on one or more of the tracked locations whether the particular user is located in a geographic location indicated by the schedule of the task assigned to the particular user at a scheduled time corresponding to a current time and, based thereon, determining the respective task progress for the particular user. Determining the respective task progress for a particular user can also comprise predicting an arrival time of the particular user to a geographic location indicated by the schedule of the task assigned to the particular user based on the tracked locations and, based thereon, determining the respective task progress for the particular user. Determining the respective task progress for a particular user can also comprise determining based on information received from the client device of the particular user is a degree of completion of the task assigned to the particular user and, based thereon, determining the respective task progress for the particular user. The task assigned to the particular user can comprise one or more milestones and the information received from the client device of the particular user is an indication of which milestones have been completed. Modifying the respective task assigned to a particular user can comprise modifying the schedule of the task assigned to the particular user or assigning a new task to the particular user. Modifying the respective task assigned to one or more of the users based on the respective task progresses can comprise calculating a performance metric based on the task progresses; and identifying the one or more second users based on, at least, the performance metric. The aspect can further comprise identifying one or more rules for a particular task, each rule specifying a respective condition and a respective action; selecting one or more of the rules for which the respective condition is satisfied; and performing the respective action of each of the selected rules. An action can comprise one or more of the following: sending an electronic notification message to a device associated with a user, modifying the task assigned to a user, or changing the task assigned to the user. The electronic notification can be one of: an electronic mail message, a short message service message, a voice mail message, a phone call, and an application-specific message.

In general, another aspect of the subject matter described in this specification can be embodied in methods that include the actions of configuring a client device to monitor the geographic location of the client device over time; and configuring the monitoring so that the monitoring cannot be terminated by a user of the client device and that disabling of the monitoring by the user will cause the client device to be locked. Other embodiments of this aspect include corresponding systems, apparatus, and computer programs.

These and other aspects can optionally include one or more of the following features. Determine whether the user has disabled the monitoring and, based thereon, sending a notification of such to a remote system and locking the client device. The aspect can further comprise receiving information from a remote system comprising one or more time periods during which a location of a client device can be tracked; monitoring the location of the client device during each of the time periods by obtaining a plurality of location coordinates from the client device during the time period and persistently storing the location coordinates on the client device; and sending different ones of the stored location coordinates to the remote system at times when a transmitter of the client device is enabled. Receiving the plurality of location coordinates from the client device may not require a transmitter of the client device to be enabled. The aspect can further comprise detecting that the client device had been powered off and, based thereon, continuing to send different ones of the stored location coordinates to the remote system at times when a transmitter of the client device is enabled. Monitoring the location of the client device during each of the time periods by receiving a plurality of location coordinates of the client device during the time period can comprise obtaining fewer location coordinates at times when the client device is traveling in a substantially straight line or at slow speeds. Monitoring the location of the client device during each of the time periods by receiving a plurality of location coordinates of the client device during the time period can comprise determining that during a first period of time the client device is in a same location and, based thereon, combining multiple location coordinates for the first period of time into a single location coordinate. Sending different ones of the stored location coordinates to the remote system at times when a transmitter of the client device is enabled can comprise determining that throughput of a first transmitter of the client device is unacceptable; and based on the determination, sending the different ones of the stored location coordinates to the remote system using a second transmitter of the client device. A particular transmitter can be a cellular transmitter or a Wi-Fi transmitter.

In general, another aspect of the subject matter described in this specification can be embodied in methods that include the actions of configuring a client device to monitor the geographic location of the client device over time; and determining that the user has disabled the monitoring and, based thereon, sending a notification of such to a remote system and locking the client device. Other embodiments of this aspect include corresponding systems, apparatus, and computer programs.

These and other aspects can optionally include one or more of the following features. The aspect can further comprise receiving information from a remote system comprising one or more time periods during which a location of a client device can be tracked; monitoring the location of the client device during each of the time periods by obtaining a plurality of location coordinates from the client device during the time period and persistently storing the location coordinates on the client device; sending different ones of the stored location coordinates to the remote system at times when a transmitter of the client device is enabled. Receiving the plurality of location coordinates from the client device may not require a transmitter of the client device to be enabled. The aspect can further comprise detecting that the client device had been powered off and, based thereon, continuing to send different ones of the stored location coordinates to the remote system at times when a transmitter of the client device is enabled. Monitoring the location of the client device during each of the time periods by receiving a plurality of location coordinates of the client device during the time period can comprise obtaining fewer location coordinates at times when the client device is traveling in a substantially straight line or at slow speeds. Monitoring the location of the client device during each of the time periods by receiving a plurality of location coordinates of the client device during the time period can comprise determining that during a first period of time the client device is in a same location and, based thereon, combining multiple location coordinates for the first period of time into a single location coordinate. Sending different ones of the stored location coordinates to the remote system at times when a transmitter of the client device is enabled can comprise determining that throughput of a first transmitter of the client device is unacceptable; and based on the determination, sending the different ones of the stored location coordinates to the remote system using a second transmitter of the client device. A particular transmitter can be a cellular transmitter or a Wi-Fi transmitter.

Particular embodiments of the subject matter described in this specification can be implemented to realize one or more of the following advantages. The system described herein automatically tracks tasks assigned to employees and tracks employees' whereabouts in order to determine whether tasks are progressing according to schedules. When this is not the case, the system can modify or reassign tasks so that the progress of the tasks in the aggregate satisfies a performance requirement. Software installed on users' mobile devices (e.g., smart phones) can be used to track user locations and send the locations to the system for purposes of assessing users' task progressions. The software can also inform the user of their task schedule and progress.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
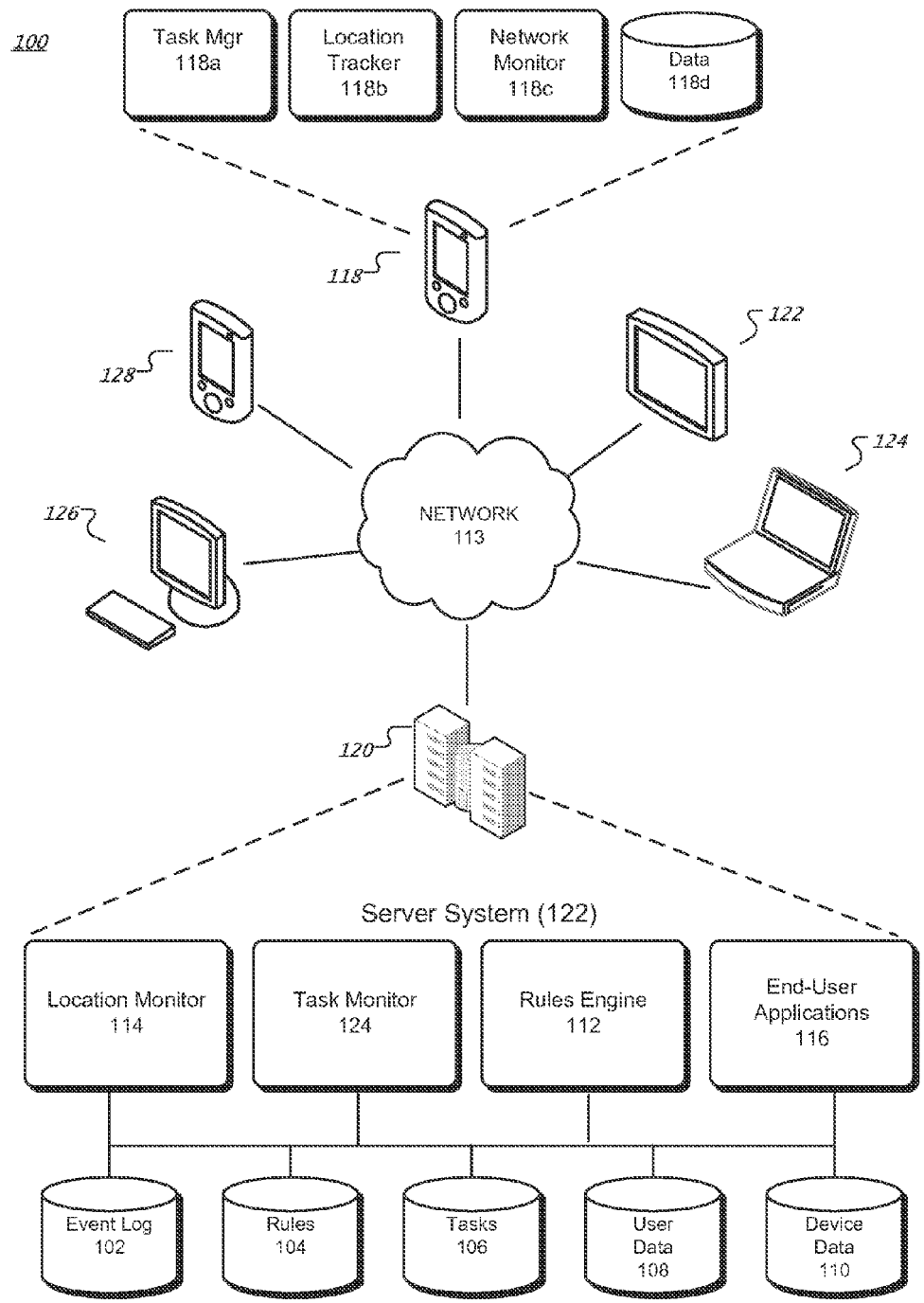
FIG. 1 illustrates an example system for task management and employee tracking

FIG. 1 illustrates an example system for task management and employee tracking. A server system 122 provides task management and employee tracking functionality. The server system 122 comprises software components and databases that can be deployed at one or more data centers 120 in one or more geographic locations, for example. The server system 122 software components comprise a location monitor 114, a task monitor 124, a rules engine 112, and end-user applications 116. The software components can comprise subcomponents that can execute on the same or on different individual data processing apparatus. The server system 122 databases comprise an event log 102, rules database 104, tasks database 106, user database 108, and device database 110. The databases can reside in one or more physical storage systems. The software components and data will be further described below.

The task monitor 124 is a software component that monitors the progress of each task assigned to a user (e.g., employee, contractor, subcontractor, client, etc.) of the server system 122. Task definitions are stored in tasks database 106. Tasks can have one or more of the properties in TABLE 1. Other task properties are possible.

TABLE 1

| Task Property | Description |
| --- | --- |
| Name | The name of the task. |
| Description | A description of the task and what it entails. |
| Priority | The task priority: critical, medium, low, or none. |
| State | The state of task progress based on milestone completion: completed, on track, ahead, behind, delinquent, or inactive. |
| User(s) or User Type(s) | The names of users or types of users than can be assigned the task. For example, the task can be assigned to users in a given company department, having a given job description, residing in a given geographic location, residing in a given time zone, having schedule availability, having a specific skill set, having a specific performance rating, or having a required license or credential. |
| Time Limit or End Date | The estimated time for completing the task or a date by which the task must be complete. |
| Travel | Whether user travel is required. |
| Milestone Schedule | A schedule for completing milestones required by the task. Each milestone can define a goal that should be accomplished by the schedule date and time of the milestone. For example, the goal could be a specific work product deliverable, |

TABLE 1-continued

| Task Property | Description |
| --- | --- |
| | a number of hours billed, or a geographic location that the user must be located in. |
| Milestone Completion | The completion status of each milestone. |
| Billing information | Billing arrangements for the task such as user billing rate(s), customer billing arrangements (e.g., fixed fee, capped, hourly), and billing rate tiers. |
| License Requirements | State or federal licenses required by the user in order to perform the task. |
| State or Federal Rules | State or federal rules that must be followed by the user performing the task. |

Information for each user of the system is stored in the user database 108, including what tasks, if any, have been assigned to the user. The properties in TABLE 2 can be stored in the user database 108 for each user. Fewer or more user properties are possible.

TABLE 2

| User Property | Description |
| --- | --- |
| Name | The name of the user. |
| Job Description | A description of the user's job. |
| Department | The user's department within a company or organization. |
| Office Location | The geographic location of the user's home office. |
| Education | Any degrees held by the user. |
| Skill(s) | Any special skills the user has. |
| License(s) | Any federal or state licenses the user holds. |
| Language(s) | The languages the user speaks. |
| Tasks(s) | The names of tasks assigned to the user. |

An application such as a web-based application can be provided as an end-user application 116 to allow users define and modify task and user properties through a graphical user interface, for example. The end-user applications 116 can be accessed through the network 113 by users of client devices (e.g., client device 126).

The task monitor 124 monitors the progress of milestone completion for each assigned task by processing events in the event log 102 in order to maintain the current state of each task. An event is a collection of information generated by the system or by a user based on their activities. In further implementations, an event can be generated by an external system such as, for example, an employee time card system which tracks when users clock in and out or an employee telephone usage tracking system. The system 122 stores events in the event log 102. Each event can have two or more of the properties in TABLE 3. Other event properties are possible.

TABLE 3

| Event Property | Description |
| --- | --- |
| Time and Date | The time and date that the event was generated. |
| Source | The identity of the user or system component that caused the event to be generated. |
| User | The identity of the user that the event pertains to. This is an optional property. |
| Task | The task the event pertains to. This is an optional property. |
| Milestone | The milestone of the task that the event pertains to. This is an optional property. |
| Type | The type of event such as, for example, a user location event, a milestone status event, a device access event, etc. Other types of events are possible. (User geographic location tracking is described further below.) |

TABLE 3-continued

| Event Property | Description |
| --- | --- |
| Data | Data for the event that depends on the event type. For example, user location event data will be the geographic location of the user, milestone status event data will indicate whether a milestone is completed, in progress, or late. Other types of data are possible. |

The location monitor 114 receives location data from portable client devices through one or more data communication networks 113 such as the Internet, for example. The client devices (e.g., 128, 118, 122, 126, and 124) are data processing apparatus such as, for instance, smart phones, tablet computers, smart watches, smart glasses, laptop and portable computers, personal computers, and other data processing apparatus. Data describing devices assigned to users is stored in device database 110. The data can include the type of device, its operating system, its Internet Protocol address, the owner of the device, and so on. The client devices can be configured to track their geographic location over time and send location updates through the network 113 to the location monitor 114. (Client device software components for location tracking are described further below.) The location monitor 114 in turn generates user location events which are inserted into the event log. For example, a user location event could contain the following information:

Time and Date: 2:23 PM, Mar. 6, 2014
Source: Location Monitor
User: Frederick Dean
Type: User Location Event
Data: 3987 Oak Street heading South West at 32 miles per hour.

The location information received from a client device will comprise a timestamp and a location of the client device at the time corresponding to the time stamp. The location information can be in the form of a street address, latitude and longitude coordinates, or another form. In some implementations, the location information received from the client device includes the compass heading and speed of travel. In other implementations, the location monitor 114 can deduce the compass heading and speed of travel by analyzing location information received from a particular client device over time.

In further implementations, if a task requires travel and a task milestone indicates a geographic location that the user must be in at a given time, the location monitor 114 can predict the time that the user will arrive at the location and generate an event. The location monitor 114 can identify such milestones in the task database 106 and find corresponding users from the user database 108 that have been assigned those tasks. Location information received from client devices of the users can then be used to generate predicted arrival times. By way of illustration, such an event comprise the following information:

Time and Date: 2:24 PM, Mar. 6, 2014
Source: Location Monitor
User: Frederick Dean
Task: Package Delivery
Milestone: Arrive at 3987 Oak Street, Pasadena, Calif. 91105.
Type: Predicted User Arrival
Data: 3:47 PM.

Task and milestone information for a user can be sent to the user's client device by the task monitor 124. This allows the client device to keep the user up-to-date on task progress as well as allowing the user to indicate when a milestone is complete (for milestones that do not indicate completion by the user being located in a specific geographic location). For example, a graphical user interface (or other user interface) on the client device can provide an input method for the user to indicate that a milestone is complete. The client device then generates an event, such as the following, and sends the event to the server system 122 for insertion in the event log 102:

Time and Date: 11:35 PM, Mar. 2, 2014
Source: Mike Towers
User: Mike Towers
Task: Project Alpha
Milestone: Code and test rate exchange software module.
Type: Milestone status event
Data: Milestone completed.

The task monitor 124 monitors the progress of milestone completion for each assigned task by processing user location events, predicted user arrival events, and milestone completion events in the event log 102 in order to maintain the current completion state of each milestone and the current state (e.g., completed, on track, ahead, behind, delinquent or inactive) of each task assigned to a user. A "completed" task is a task where all of the milestones have been completed. An "on track" task is a task that is not completed but where the user has not fallen behind the milestone completion schedule. An "ahead" task is a task where the user has completed the most recent milestone ahead of schedule. A "behind" task is a task where the user has failed to complete the currently due milestone on schedule. A "delinquent" task is one where the user has failed to complete more than one milestone on schedule, including the most recent milestone. Finally, an "inactive" task is one in which a user has indicated that the task is not to be tracked. Other types of task states are possible. The task monitor 124 generates events in the event log 102 when task state changes. For example, the task monitor 124 can generate the following event indicating that Mike Towers has completed the task Project Alfa (assuming that Code and test rate exchange software module milestone was the last milestone):

Time and Date: 11:35 PM, Mar. 2, 2014
Source: Task Monitor
User: Mike Towers
Task: Project Alpha
Type: Task State Event
Data: Completed The task monitor 124 can also calculate measures of the overall system performance based on that status of all active events in the system and generate events for these measures in the event log 102. For example, performance measure M1 is calculated as follows:

$$M1 = \frac{O+A}{T}$$

where O is the number of on track tasks, A is the number of ahead tasks, and T is the total number of active tasks in the system. Performance measure M2 is calculated as follows:

$$M2 = \frac{B+D}{T}$$

Where B is the number of behind tasks, D is the number of delinquent tasks. Yet another measure could be the average of M1 or M2 over time:

$$M3 = \frac{\sum_{i=1}^{n} M1_i}{n}$$

User-defined rules can be triggered based on the performance measure events in the event log 102 and take action to improve the performance of the system by changing and/or redistributing tasks among users.

The rules engine 112 is the heart of the system and drives automatic task management through user-defined rules that perform actions automatically when the rules' conditions are satisfied. A rule can have the properties listed in TABLE 4, however other rule properties are possible. Rules are stored in the rule database 104. An application such as a web-based application can be provided as an end-user application 116 and offer the ability to define and modify rules through a graphical user interface, for example.

TABLE 4

| Rule Property | Description |
| --- | --- |
| Name | The name of the rule. |
| Description | A description of the rule and what it entails. |
| Task(s) | The task name or names to which the rule applies. Can be a wildcard which means the rule applies to any task. This is an optional property. |
| Milestone(s) | The task milestone(s) to which the rule applies. Can be a wildcard which means the rule applies to any milestone. This is an optional property. |
| Condition(s) | A set of one or more Boolean expressions that must be satisfied in order for the rule action(s) to be performed. |
| Action(s) | A set of one or more actions to perform when the rule conditions are satisfied. Rules can reassign tasks based on performance of system or a user, for example. |

In some implementations, the rules engine 112 scans the event log 102 for new events—events that it has not processed previously. For each new event, the rules engine 112 then identifies any rules in the rules database 104 that have a task, or task and milestone, that matches the new event's corresponding task or task and milestone. If there is a match, the rules engine 112 evaluates each identified rule's conditions to determine if they are satisfied. A condition is a set of one or more Boolean expression that, if evaluate to true, will cause the rules engine 112 to perform the associated action(s). The Boolean expression can refer to intrinsic data such as properties of tasks, users, and events. In addition, the Boolean expression can refer to extrinsic data such as the time of day, weather conditions in a given location, news reports, and so on.

For example, when satisfied the following rule notifies a dispatcher that the user assigned to the task is 30 minutes away from arriving at a given geographic location:

Name: Package Notification

Description: Notify dispatcher when employee is near drop off.

Task: Package Delivery

Milestone: Arrive at 3987 Oak Street, Pasadena, Calif. 91105.

Condition: Task.Predicted_arrival_time IS current_time+ 30 minutes

Action: NotifyDispatcher("Task.user is 30 minutes away from delivering package.")

The intrinsic data used in the condition of the above rule is the predicted arrival time for the task (Task.Predicted_arrival_time) which is determined using a Predicted User Arrival event from the event log 102 for the task and the user assigned to the task, and the identity of the user assigned to the task (Task.user) which is stored in the user database 108. A function NotifyDispatcher is defined by the system 122 and causes a message to be sent to the dispatcher (e.g., another user) associated with the task. The message can be in the form of a text message, an electronic mail message, a phone call, or other type of message.

By way of a further illustration, performance measurement events in the event log 102 can trigger rules that modify or reassign tasks in order to meet a system wide performance goal (e.g., M1, M2 or M3).

Name: Reassign Task

Description: Reassign a delinquent task to another user.

Task: Software Development

Milestone: Implement User API

Condition: System.M1<0.8 AND Task.state IS "delinquent"

Action: ReassignTask(Task, Task.user)

The above rule reassigns delinquent Software Development tasks when the system performance drops below 80%. The intrinsic data used in the condition of the above rule is the system performance measure M1 (System.M1) which is obtained from the event log 102, and the task state (Task.state) for the Software Development task assigned to the user (Task.user) which can be obtained from the user database 108. The ReassignTask function is defined by the system 122 and reassigns the task from the assigned user to a new user.

By way of a further example, the following rule modifies a milestone date for a task whose state is behind to give the user more time to complete the milestone:

Name: Push out behind milestone

Description: Reassign a delinquent task to another user.

Task: Software Development

Milestone: Implement User API

Condition: Task.state IS "behind"

Action: PushOutMilestone(Milestone, Task.user, 2 weeks)

The intrinsic data used in the condition of the above rule is the task state (Task.state) for the Software Development task assigned to the user (Task.user) which can be obtained from the user database 108. The PushOutMilestone function is defined by the system 122 and moves the milestone completion data ahead two weeks for the given user and task. Other types of rules are possible.

As described above, user location tracking is performed by client devices (e.g., 128, 118, 122, and 124). A client device (e.g., client device 118) has software components installed on it for managing tasks assigned to the user of the client device and tracking the user's (i.e., the device's) location. The task manager 118a component provides a graphical user interface on the client device which allows the user to review milestone deliverables and schedules for their assigned tasks and can also automatically remind the user in advance when a scheduled milestone deadline is approaching. The task manager 118a also provides a graphical user interface (or other interface such as natural language) that allows a user to send a milestone status event to the server system 122 which will be entered into the event log by the task monitor 124. For example, the user can indicate through the user interface that a milestone has been completed or that a milestone was missed (and provide a reason).

Location tracker 118b is a software component that executes on the client device and that records the current geographic location information of the client device at different times and persistently stores the locations in data store 118d which retains its data across client device power cycles. In some implementations, the location tracker 118b treats the data store 118d as a stack with the most recently obtained geographic location information being "pushed" on top of the stack. In addition to location coordinates, the current geographical information can include the compass heading and speed of travel of the client device. In some implementations, the task manager 118a receives from the location monitor 114 a set of one or more time periods during which the location of the client device can be tracked and the location tracker 118b only tracks location during those times (e.g., working hours). The location tracker 118b obtains the current geographic location from an operating system (OS) service of the client device. The OS obtains the current location using Global Positioning System (GPS) or base station triangulation. Location information can be obtained from the OS even if the client device is in "airplane mode" since only transmit functionality of the radios on the client device are disabled, not the receive functionality. When transmitters on the client device are disabled, the location tracker 118b continues to obtain location data and stores it in data store 118d.

Network monitor 118c is a software component that executes on the client device and that is responsible for sending location information to the location monitor 114. When a transmitter is enabled on the client device the network monitor 118c will "pop" geographic location information off of the location stack in the data store 118d send the location information to the location monitor 114. The network monitor 118c monitors the performance of the transmitter used to transmit location information to the location monitor 114 and, if the performance is not acceptable either because the data rate is too slow or the channel has become unreliable, the network monitor 118c can use a different transmitter to transmit the location data. For example, if the cellular transmitter is performing poorly, the location information can be sent over the Wi-Fi transmitter (or vice versa).

The location tracker 118b utilize several parameters for its operation. The parameters are described in TABLE 5 below.

TABLE 5

| Parameter | Description |
| --- | --- |
| UPDATE_INTERVAL | A time threshold measured in seconds which is compared against a time of the location at the top of the location stack in the data store 118d. |
| DISTANCE_INTERVAL | A distance threshold measured in meters which is compared against the location at the top of the location stack in the data store 118d. |
| ACCEPTABLE_GPS_ACCURACY | A minimum accuracy threshold measured in meters. |
| ACCEPTABLE_NETWORK_ACCURACY | An minimum accuracy threshold measured in meters. |
| DISTANCE_BETWEEN_HITS | A variable measured in meters containing the distance between the current location and the location on the top of the stack. |
| BEARING_BETWEEN_HITS | A variable measured in degrees on a 360° scale containing the difference of magnetic bearing (or direction) between current location and the location on the top of the stack. |
| TIME_ELAPSED_BETWEEN_HITS | A variable measured in seconds containing the difference between the current location and the location on the top of the stack. |
| CURRENT_SPEED | A variable measured in meters/second containing the speed of current location. |

In some implementations, the location tracker 118b will discard location information obtained from the OS that does not satisfy accuracy thresholds. GPS locations having accuracies that do not exceed the ACCEPTABLE_GPS_ACCURACY are discarded (i.e., they are not stored in the data store 118d. Likewise, Wi-Fi triangulation locations having accuracies that do not exceed the ACCEPTABLE_NETWORK_ACCURACY are also discarded.

If a given geographic location has acceptable accuracy, then the location tracker 118b will determine whether or not the location should be pushed onto the location stack in the data store 118d based on an algorithm that decreases the amount of data transferred from the client device to the location monitor 114. The algorithm reduces the use of client device's transmitter (and therefore increases battery life of the client device) and provides the location monitor 114 with an easy to visualize path of travel by omitting redundant and unneeded location information. Based on the CURRENT_SPEED of the client device, the location tracker 118b performs operations in accordance with TABLE 6 below for location information obtained from the OS.

TABLE 6

| CURRENT_SPEED | Action Taken for Newly Obtained Location Information |
| --- | --- |
| 0 Miles per hour (MPH) | If the UPDATE_INTERVAL has past, the new location information is pushed on the location stack in the data store 118d, otherwise the new location information is discarded. |
| Greater than 0 MPH but less than or equal to walking speed | If any of the following conditions are true, the new location information is pushed on the location stack in the data store 118d, otherwise the new location information is discarded:<br>The DISTANCE_INTERVAL threshold been passed;<br>The UPDATE_INTERVAL has elapsed; or<br>The BEARING_BETWEEN_HITS exceeded the threshold of the last location sent to the location monitor 114 and the distance traveled since the last sent location is greater than the DISTANCE_INTERVAL. |
| Greater than walking speed | If any of the following conditions are true, the new location information is pushed on the location stack in the data store 118d, otherwise the new location information is discarded:<br>The bearing of the current location has exceeded the BEARING_BETWEEN_HITS; or<br>The UPDATE_INTERVAL has elapsed. |

In some implementations, the location tracker 118b is a supervisory or other special process in the mobile device OS that cannot be terminated by users of the device. For example, on mobile devices running the Android operating system, the location tracker 118b is programmed as a persistent foreground service which runs at a higher priority than normal application processes. This prevents the operating system from randomly killing the process when the device needs to acquire more resources.

In further implementations, the location tracker 118b is programmed to lock the client device if the user disables the location tracker 118b. The location tracker 118b can also send a notification message to location monitor 114 indicating that the user has disabled location tracking. This can be recorded as an event in the event log 102 so that rules can perform actions on the occurrence of such events. For instance, the location tracker 118b can utilize an Android permission "device administrator" which grants it higher privileges than other applications and the ability to lock the client device, change its password, and erase the client device. In addition, the "device administrator" permission permits the location tracker 118b to detect when a user attempts to disable the location tracker 118b.

Figure 2A:
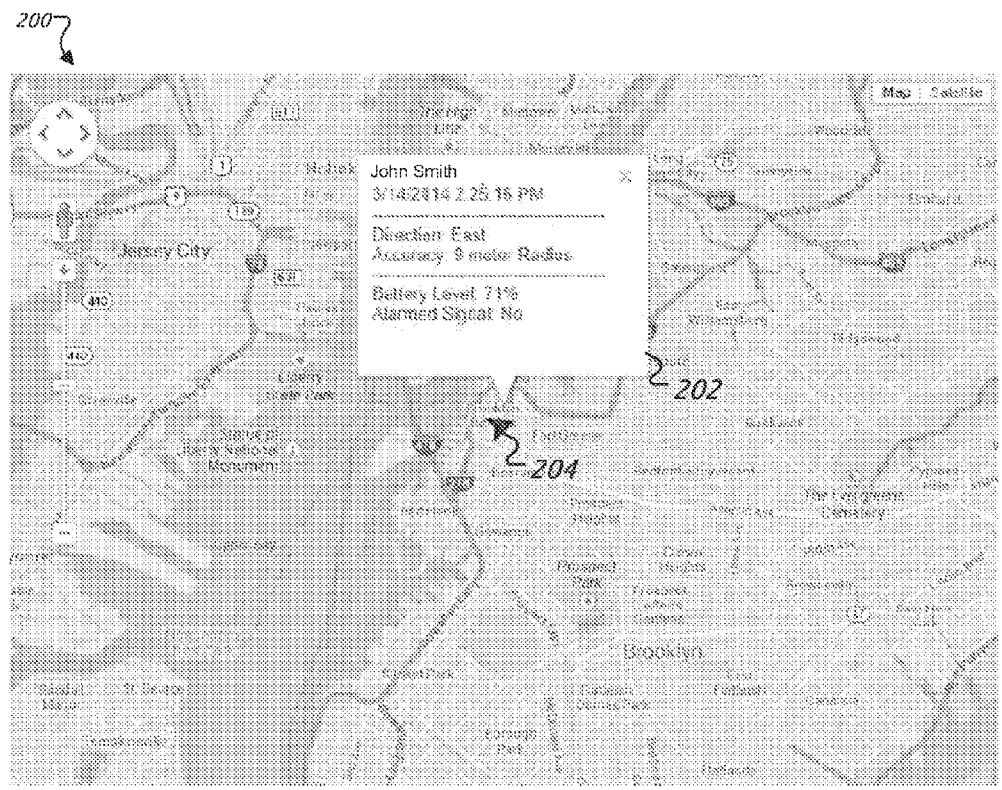
FIG. 2A is an example user interface for displaying location data for a user.

FIG. 2A is an example user interface 200 for displaying location data for a user. The user interface 200 can be provided by an end-user application 116 that determines a user's current location by finding the most recent location event for the user's client device in the event log 102. The location event can include the client device's current location as of a given time and date, the bearing, and the speed of travel of the client device. This information can be plotted on the user interface 200. For example, the arrow 204 indicates the mobile device's current location with the compass bearing reflected in the direction of the arrow 204. A pop-up window 202 displays detailed information such as, for instance, the user name, the date and time of the location event, the bearing, a measure of accuracy of the location information, the remaining battery level for the client device, and so on. The user interface 200 can display the location information for more than one client device including, for example, the location information for client devices of users assigned a particular task. Other ways of selecting location information to display in the user interface 200 are possible.

Figure 2B:
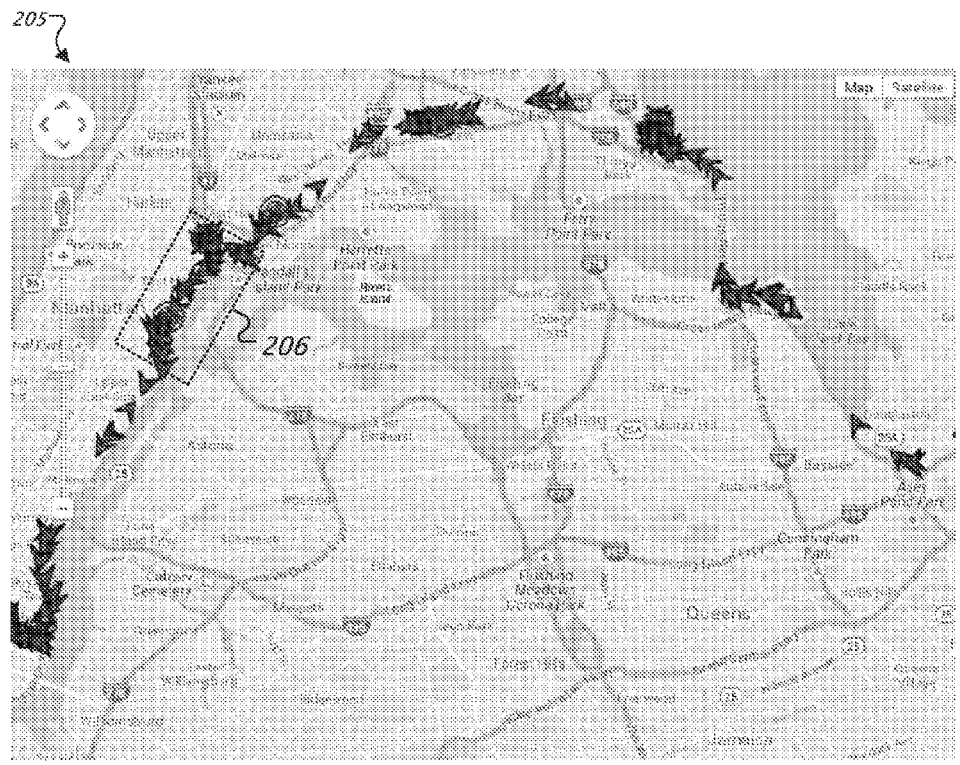
FIG. 2B is an example user interface for displaying a user's location history.

FIG. 2B is an example user interface 205 for displaying a user's location history over time. The user interface 205 can be provided by an end-user application 116 that determines a user's locations over time by finding the location events for the user's client device in the event log 102. Location events can plotted as arrows on a geographic map such as the map displayed in user interface 205. By way of illustration, the rectangle 206 indicates the various locations of a user's client device for a specific period of time (e.g., 2:00-2:30 PM on Jan. 2, 2014). The user interface 205 can display the location information for more than one client device including, for example, the location information for client devices of users assigned a particular task. Other ways of selecting location information to display in the user interface 200 are possible.

Figure 3:
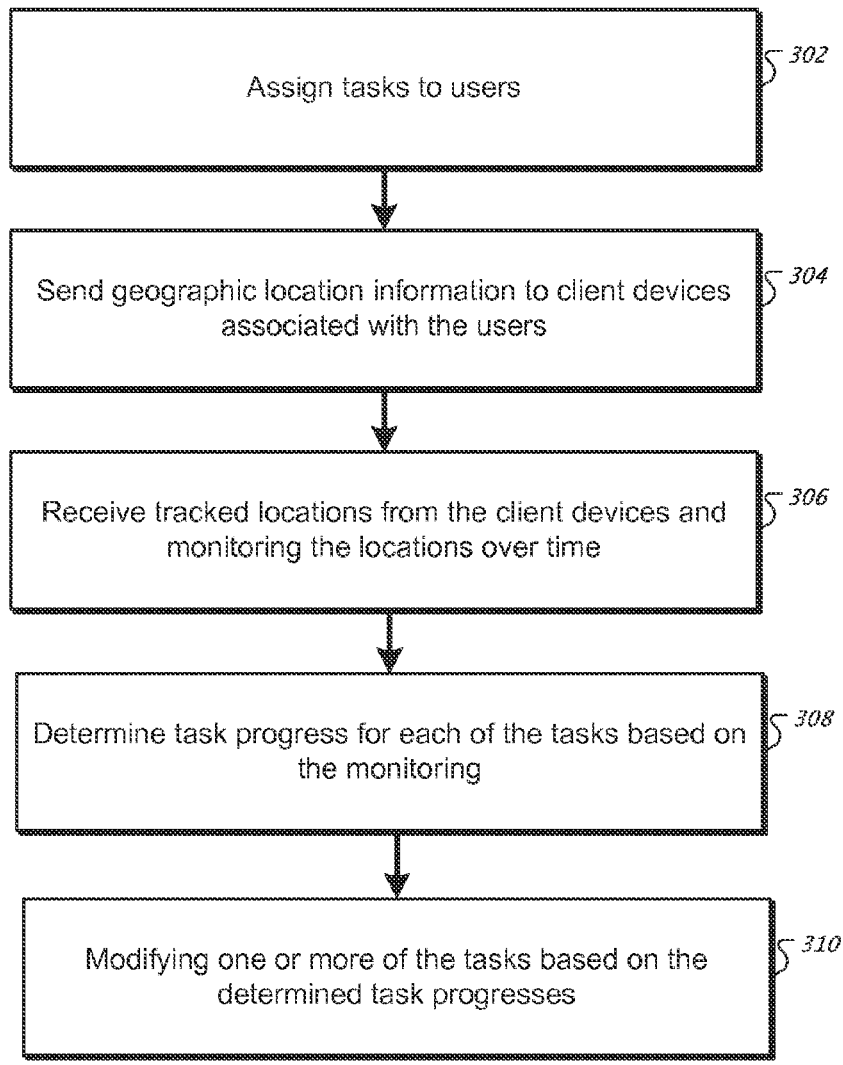
FIG. 3 is a flowchart of an example method for managing user tasks.

FIG. 3 is a flowchart of an example method for managing user tasks. The method can be implemented using one or more data processing apparatus such as, for example, data processing apparatus that are part of the data center 120. The method begins by assigning tasks to users (302). A task can be assigned to a user by an end-user application 116 that allows changing the assigned tasks property of a user record or by a rule action (e.g., the rules engine 112) that assigns a task to a user. Geographic location information in the form of, for example, a milestone schedule specifying one or more locations that the user must be located in at respective times set forth by the schedule is sent by, for example, the task monitor 124 to the client devices (304). Tracked locations are then received from the client devices and are monitored over time (306) by the location monitor 114, for instance. One or more of the assigned tasks are then modified (e.g., by the rules engine 112) based on the event log 102 information that reflects the monitored locations.

Figure 4:
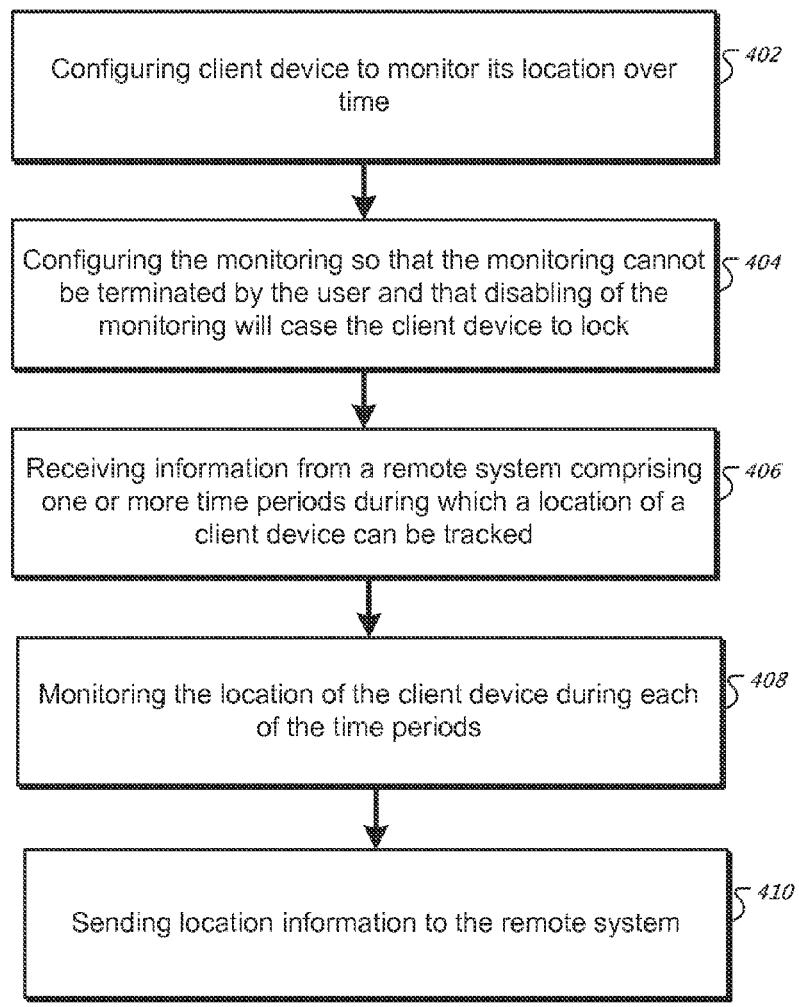
FIG. 4 is a flowchart of an example method for tracking a user's location.

FIG. 4 is a flowchart of an example method for tracking a user's location. The method can be implemented using one or more data processing apparatus such as, for example, client device 118. The method begins by configuring a client device, e.g., by the location tracker 118b, to monitor the geographic location of the client device over time (402). The location monitoring is configured so that it cannot be terminated by a user of the client device and that disabling of the monitoring by the user will cause the client device to be locked (404). Information is received from a remote system, e.g., the server system 122, by the client device (e.g., by the task manager 118a) indicating one or more time periods during which the location of the client device can be tracked (406). The location of the client device is monitored during each of the time periods by, for example, the location tracker 118b and the location information is persistently stored on the client device in data store 118d, for instance (408). The stored location data is then sent to the remote system at different times (e.g., by the location tracker 118b) when a transmitter on the client device is enabled.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
configuring a client device to monitor the geographic location of the client device over time;
configuring the monitoring so that the monitoring cannot be terminated by a user of the client device and that disabling of the monitoring by the user will cause the client device to be locked;
receiving, by the client device, information from a remote system comprising one or more time periods during which a location of the client device can be tracked;

monitoring, by the client device, the location of the client device by obtaining a plurality of location coordinates during each of the time periods and persistently storing the location coordinates on the client device;

determining that a first transmitter of the client device is unacceptable; and based on the determination, sending different ones of the stored location coordinates to the remote system using a second transmitter of the client device.

2. The method of claim 1, further comprising:

determining that the user has disabled the monitoring and, based thereon, sending a notification of such to a remote system and locking the client device.

3. The method of claim 1 wherein obtaining the plurality of location coordinates does not require a transmitter of the client device to be enabled.

4. The method of claim 1, further comprising:

detecting that the client device had been powered off and, based thereon, continuing to send different ones of the stored location coordinates to the remote system at times when a transmitter of the client device is enabled.

5. The method of claim 1 wherein monitoring the location of the client device during each of the time periods by obtaining a plurality of location coordinates of the client device during the time period comprises:

obtaining fewer location coordinates at times when the client device is traveling in a substantially straight line or at slow speeds.

6. The method of claim 1 wherein monitoring the location of the client device during each of the time periods by obtaining a plurality of location coordinates of the client device during the time period comprises:

determining that during a first period of time the client device is in a same location and, based thereon, combining multiple location coordinates for the first period of time into a single location coordinate.

7. The method of claim 1 wherein a particular transmitter is a cellular transmitter or a Wi-Fi transmitter.

8. A system comprising:

data processing apparatus programmed to perform operations comprising:

A computer-implemented method comprising:

configuring a client device to monitor the geographic location of the client device over time;

configuring the monitoring so that the monitoring cannot be terminated by a user of the client device and that disabling of the monitoring by the user will cause the client device to be locked;

receiving, by the client device, information from a remote system comprising one or more time periods during which a location of the client device can be tracked;

monitoring, by the client device, the location of the client device by obtaining a plurality location coordinates during each of the time periods and persistently storing the location coordinates on the client device;

determining that a first transmitter of the client device is unacceptable; and based on the determination, sending different ones of the stored location coordinates to the remote system using a second transmitter of the client device.

9. The system of claim 8 wherein the operations further comprise:

determining that the user has disabled the monitoring and, based thereon, sending a notification of such to a remote system and locking the client device.

10. The system of claim 8 wherein obtaining the plurality of location coordinates does not require a transmitter of the client device to be enabled.

11. The system of claim 8 wherein the operations further comprise:

detecting that the client device had been powered off and, based thereon, continuing to send different ones of the stored location coordinates to the remote system at times when a transmitter of the client device is enabled.

12. The system of claim 8 wherein monitoring the location of the client device during each of the time periods by obtaining a plurality of location coordinates of the client device during the time period comprises:

obtaining fewer location coordinates at times when the client device is traveling in a substantially straight line or at slow speeds.

13. The system of claim 8 wherein monitoring the location of the client device during each of the time periods by obtaining a plurality of location coordinates of the client device during the time period comprises:

determining that during a first period of time the client device is in a same location and, based thereon, combining multiple location coordinates for the first period of time into a single location coordinate.

14. The system of claim 8 wherein a particular transmitter is a cellular transmitter or a Wi-Fi transmitter.

\* \* \* \* \*